United States Patent [19]

Welter, Jr.

[11] Patent Number: 5,852,659

[45] Date of Patent: Dec. 22, 1998

[54] SYSTEM AND METHOD FOR IMPROVED BILLING RECORDS

[75] Inventor: William G. Welter, Jr., Colorado Springs, Colo.

[73] Assignee: MCI Communications Corporations, Washington, D.C.

[21] Appl. No.: 581,736

[22] Filed: Dec. 29, 1995

[51] Int. Cl.$^6$ .................................................. H04M 15/00
[52] U.S. Cl. .......................... 379/116; 379/120; 379/126; 379/128
[58] Field of Search ..................................... 379/112, 114, 379/115, 116, 119, 120, 121, 127, 126, 122, 128, 125; 395/611, 616, 621

[56] References Cited

U.S. PATENT DOCUMENTS

| 5,003,584 | 3/1991 | Benyacar et al. | 379/119 |
| 5,103,475 | 4/1992 | Shuen | 379/112 |
| 5,179,584 | 1/1993 | Tsumura | 379/119 |
| 5,511,113 | 4/1996 | Tasaki et al. | 379/115 |

*Primary Examiner*—Paul Loomis

[57] ABSTRACT

A system and method for the switches of a telecommunications network to generate call records for telephone calls using a flexible and expandable record format. Upon receipt of a telephone call, a switch in the network analyzes the telephone call to determine whether the default call record is sufficiently large to store call record information pertaining to the telephone call, or whether the expanded call record must be used to store the call information pertaining to the telephone call. After determining which call record to use, the switch generates the default or expanded call record. The switch sends a billing block, comprised of completed call records, to a billing center upon filling an entire billing block.

14 Claims, 13 Drawing Sheets

|  | MSB | | | | | | | | | | | | | | LSB |
|---|---|---|---|---|---|---|---|---|---|---|---|---|---|---|---|
| BITS | 00 | 01 | 02 | 03 | 04 | 05 | 06 | 07 | 08 | 09 | 10 | 11 | 12 | 13 | 14 | 15 |
| WORD 00 | CRID | | | | CDID | | | | | | | | | | | |
| 01 | TP1 BITS 0–15 | | | | | | | | | | | | | | | |
| 02 | TP1 BITS 16–31 | | | | | | | | | | | | | | | |
| 03 | TP3 BITS 0–12 | | | | | | | | | | | | | TP6 0–2 | | |
| 04 | TP6 BITS 3–12 | | | | | | | | | | | TP7 BITS 0–5 | | | | |
| 05 | TP7 BITS 6–21 | | | | | | | | | | | | | | | |
| 06 | OPL, ORIGINATING PORT 0–15 | | | | | | | | | | | | | | | |
| 07 | OP | | | TPL, TERMINATING PORT 0–14 | | | | | | | | | | | | |
| 08 | TP | | | OTG, ORIGINATING TRUNK GROUP | | | | | | | | | | | | TT |
| 09 | TERMINATING TRUNK GROUP (1–12) | | | | | | | | | | | | TP3Q | | | |
| 10 | TP6Q | | | ACTION CODE | | | | | OTC | | | | TTC | | | |
| 11 | ID1 | | | | ID2 | | | | ANI INDEX | | | | | | | |
| 12 | CLI 1 | | | | CLI 2 | | | | CLI 3 | | | | CLI 4 | | | |
| 13 | CLI 5 | | | | CLI 6 | | | | CLI 7 | | | | CLI 8 | | | |
| 14 | CLI 9 | | | | CLI 10 | | | | A1 | | | | A2 | | | |
| 15 | A3 | | | | A4 | | | | A5 | | | | A6 | | | |
| 16 | A7 | | | | A8 | | | | A9 | | | | A10 | | | |
| 17 | A11 | | | | A12 | | | | A13 | | | | A14 | | | |
| 18 | A15 | | | | A16 | | | | A17 | | | | A18 | | | |
| 19 | A19 | | | | A20 | | | | A21 | | | | A22 | | | |
| 20 | D1 | | | | D2 | | | | D3 | | | | D4 | | | |
| 21 | D5 | | | | D6 | | | | D7 | | | | D8 | | | |
| 22 | D9 | | | | D10 | | | | D11 | | | | D12 | | | |
| 23 | D13 | | | | D14 | | | | D15 | | | | D16 | | | |
| 24 | D17 | | | | PTD1 | | | | PTD2 | | | | PTD3 | | | |
| 25 | PTD4 | | | | PTD5 | | | | PTD6 | | | | PTD7 | | | |
| 26 | PTD8 | | | | PTD9 | | | | PTD10 | | | | | | | |
| 27 | FC | | | | TNC | | | | NAT | | | | TP7Q | | | |
| 28 | EC, ENTRY CODE | | | | | | | PD | | | NDID | | | DIVID | | |
| 29 | DO | | CC | IN | | SC | CD | DE | DT | | | SA | | NOCLI | | |
| 30 | CN1 | | | | CN2 | | | | CN3 | | | | CN4 | | | |
| 31 | ACIF | | | | SS7 RELEASE CODE | | | | | | | | NCIDSEQ | | NL | RS |
| BITS | 00 | 01 | 02 | 03 | 04 | 05 | 06 | 07 | 08 | 09 | 10 | 11 | 12 | 13 | 14 | 15 |

*FIG. 3*

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID ||||| CDID |||||||||||
| 01 | TP1 BITS 0-15 ||||||||||||||||
| 02 | TP1 BITS 16-31 ||||||||||||||||
| 03 | TP3 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL, ORIGINATING PORT 0-15 ||||||||||||||||
| 07 | OP || TPL, TERMINATING PORT 0-14 ||||||||||||||
| 08 | TP ||| OTG, ORIGINATING TRUNK GROUP |||||||||||| TT |
| 09 | TERMINATING TRUNK GROUP (1-12) |||||||||||| TP3Q ||||
| 10 | TP6Q ||| ACTION CODE ||||| OTC |||| TTC ||||
| 11 | ID1 |||| ID2 |||| ANI INDEX ||||||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| CLI 11 |||| CLI 12 ||||
| 15 | CLI 13 |||| CLI 14 |||| CLI 15 |||| A1 ||||
| 16 | A2 |||| A3 |||| A4 |||| A5 ||||
| 17 | A6 |||| A7 |||| A8 |||| A9 ||||
| 18 | A10 |||| A11 |||| A12 |||| A13 ||||
| 19 | A14 |||| A15 |||| A16 |||| A17 ||||
| 20 | A18 |||| A19 |||| A20 |||| A21 ||||
| 21 | A22 |||| A23 |||| A24 |||| A25 ||||
| 22 | A26 |||| A27 |||| A28 |||| A29 ||||
| 23 | A30 |||| A31 |||| A32 |||| A33 ||||
| 24 | A34 |||| A35 |||| A36 |||| A37 ||||
| 25 | A38 |||| A39 |||| A40 |||| A41 ||||
| 26 | A42 |||| A43 |||| A44 |||| A45 ||||
| 27 | FC |||| TNC |||| NAT |||| TP7Q ||||
| 28 | EC, ENTRY CODE |||||| PD ||| NDID ||| DIVID ||||
| 29 | DO | MN | CC | IN | SC | CD | DE | DT ||| SA | NOCLI |||||
| 30 | CN1 |||| CN2 |||| CN3 |||| CN4 ||||
| 31 | ACIF |||| SS7 RELEASE CODE |||||||| NCIDSEQ ||| NL | RS |

*FIG. 4A*

| BITS | 00 01 02 03 | 04 05 06 07 | 08 09 10 11 | 12 13 14 15 |
|---|---|---|---|---|
| 32 | | | | |
| 33 | | | | |
| 34 | D1 | D2 | D3 | D4 |
| 35 | D5 | D6 | D7 | D8 |
| 36 | D9 | D10 | D11 | D12 |
| 37 | D13 | D14 | D15 | D16 |
| 38 | D17 | D18 | D19 | D20 |
| 39 | D21 | D22 | D23 | D24 |
| 40 | D25 | PTD1 | PTD2 | PTD3 |
| 41 | PTD4 | PTD5 | PTD6 | PTD7 |
| 42 | PTD8 | PTD9 | PTD10 | PTD11 |
| 43 | PTD12 | PTD13 | PTD14 | PTD15 |
| 44 | EIR CALL TYPE || OVFVAL || CB |
| 45 | OVFCL | DTA 1 | DTA 2 | DTA 3 |
| 46 | DTA 4 | DTA 5 | DTA 6 | DTA 7 |
| 47 | DTA 8 | DTA 9 | DTA 10 | DTA 11 |
| 48 | DTA 12 | DTA 13 | DTA 14 | DTA 15 |
| 49 | OVFC || DTAC || NCID |
| 50 | NETWORK CALL IDENTIFIER (NCID) ||||
| 51 | NETWORK CALL IDENTIFIER (NCID) ||||
| 52 | NETWORK CALL IDENTIFIER (NCID) ||||
| 53 | NETWORK CALL IDENTIFIER (NCID) ||||
| 54 | NETWORK CALL IDENTIFIER (NCID) ||||
| 55 | | | | |
| 56 | | | | |
| 57 | | | | |
| 58 | | | | |
| 59 | | | UUS TYPE | UUIE |
| 60 | UUIE COUNT CONT. ||| OVFCS |
| 61 | ORIGINATING NX64 BITMAP (1–16) ||||
| 62 | ORIG NX64 BITMAP (17–24) || TERM NX64 BITMAP (1–8) ||
| 63 | TERMINATING NX64 BITMAP (9–24) ||||

BITS 00 01 02 03 04 05 06 07 08 09 10 11 12 13 14 15

*FIG. 4B*

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID ||||| CDID |||||||||||
| 01 | TP1 BITS 0-15 ||||||||||||||||
| 02 | TP1 BITS 16-31 ||||||||||||||||
| 03 | TP4 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL, ORIGINATING PORT 0-15 ||||||||||||||||
| 07 | OP || TPL, TERMINATING PORT 0-14 ||||||||||||||
| 08 | TP ||| OTG, ORIGINATING TRUNK GROUP |||||||||||| TT |
| 09 | TERMINATING TRUNK GROUP (1-12) |||||||||| TP3Q ||||||
| 10 | TP6Q ||| ACTION CODE ||||| OTC |||| TTC ||||
| 11 | ID1 |||| ID2 |||| ONACC |||| TNACC ||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| A1 |||| A2 ||||
| 15 | A3 |||| A4 |||| A5 |||| A6 ||||
| 16 | A7 |||| A8 |||| A9 |||| A10 ||||
| 17 | A11 |||| A12 |||| A13 |||| A14 ||||
| 18 | A15 |||| A16 |||| A17 |||| A18 ||||
| 19 | A19 |||| A20 |||| A21 |||| A22 ||||
| 20 | D1 |||| D2 |||| D3 |||| D4 ||||
| 21 | D5 |||| D6 |||| D7 |||| D8 ||||
| 22 | D9 |||| D10 |||| D11 |||| D12 ||||
| 23 | D13 |||| D14 |||| D15 |||| D16 ||||
| 24 | D17 |||| OPIN ||||||||||||
| 25 | OPIN ||| TPS BITS 0-12 |||||||||||||
| 26 | RN1 |||| RN2 |||| RN3 |||| RN4 ||||
| 27 | FC |||| TNC |||| NAT |||| TP7Q ||||
| 28 | EC, ENTRY CODE |||||||| PD ||| NDID || DIVID |||
| 29 | DO || CC | IN || SC | CD | DE | DT | PP | XC | SA | NOCLI |||||
| 30 | CN1 |||| CN2 |||| CN3 |||| CN4 ||||
| 31 | ACIF |||| SS7 RELEASE CODE |||||||| NCIDSEQ ||| NL | RS |

*FIG. 5*

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID ||||| CDID |||||||||||
| 01 | TP1 BITS 0-15 ||||||||||||||||
| 02 | TP1 BITS 16-31 ||||||||||||||||
| 03 | TP4 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL, ORIGINATING PORT 0-15 ||||||||||||||||
| 07 | OP ||| TPL, TERMINATING PORT 0-14 |||||||||||||
| 08 | TP ||| OTG, ORIGINATING TRUNK GROUP |||||||||||| TT |
| 09 | TERMINATING TRUNK GROUP (1-12) |||||||||| TP3Q ||||||
| 10 | TP6Q ||| ACTION CODE |||| OTC |||| TTC ||||
| 11 | ID1 ||| ID2 ||| ONACC |||| TNACC ||||||
| 12 | CLI 1 ||| CLI 2 ||| CLI 3 |||| CLI 4 ||||||
| 13 | CLI 5 ||| CLI 6 ||| CLI 7 |||| CLI 8 ||||||
| 14 | CLI 9 ||| CLI 10 ||| CLI 11 |||| CLI 12 ||||||
| 15 | CLI 13 ||| CLI 14 ||| CLI 15 |||| A1 ||||||
| 16 | A2 ||| A3 ||| A4 |||| A5 ||||||
| 17 | A6 ||| A7 ||| A8 |||| A9 ||||||
| 18 | A10 ||| A11 ||| A12 |||| A13 ||||||
| 19 | A14 ||| A15 ||| A16 |||| A17 ||||||
| 20 | A18 ||| A19 ||| A20 |||| A21 ||||||
| 21 | A22 ||| A23 ||| A24 |||| A25 ||||||
| 22 | A26 ||| A27 ||| A28 |||| A29 ||||||
| 23 | A30 ||| A31 ||| A32 |||| A33 ||||||
| 24 | A34 ||| A35 ||| A36 |||| A37 ||||||
| 25 | A38 ||| A39 ||| A40 |||| A41 ||||||
| 26 | A42 ||| A43 ||| A44 |||| A45 ||||||
| 27 | FC ||| TNC ||| NAT |||| TP7Q ||||||
| 28 | EC, ENTRY CODE |||||| PD ||| NDID ||| DIVID |||
| 29 | DO | MN | CC | IN | SC | CD | DE | DT | PP | XC | SA | NOCLI |||||
| 30 | CN1 ||| CN2 ||| CN3 |||| CN4 ||||||
| 31 | ACIF ||| SS7 RELEASE CODE |||||| NCIDSEQ ||| NL | RS ||

EOSR/EPOSR FORMAT

*FIG. 6A*

|      | MSB |   |   |   |   |   |   |   |   |   |   |   |   |   | LSB |
| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 32 | T&C GUEST 1 ||||||||  T&C GUEST 2 ||||||||
| 33 | T&C GUEST 3 ||||||||  T&C GUEST 4 ||||||||
| 34 | D1 |||| D2 |||| D3 |||| D4 ||||
| 35 | D5 |||| D6 |||| D7 |||| D8 ||||
| 36 | D9 |||| D10 |||| D11 |||| D12 ||||
| 37 | D13 |||| D14 |||| D15 |||| D16 ||||
| 38 | D17 |||| D18 |||| D19 |||| D20 ||||
| 39 | D21 |||| D22 |||| D23 |||| D24 ||||
| 40 | D25 |||| PTD1 |||| PTD2 |||| PTD3 ||||
| 41 | PTD4 |||| PTD5 |||| PTD6 |||| PTD7 ||||
| 42 | PTD8 |||| PTD9 |||| PTD10 |||| PTD11 ||||
| 43 | PTD12 |||| PTD13 |||| PTD14 |||| PTD15 ||||
| 44 | EIR CALL TYPE |||||||| OVFVAL ||||||| CB |
| 45 | OVFCL |||| DTA 1 |||| DTA 2 |||| DTA 3 ||||
| 46 | DTA 4 |||| DTA 5 |||| DTA 6 |||| DTA 7 ||||
| 47 | DTA 8 |||| DTA 9 |||| DTA 10 |||| DTA 11 ||||
| 48 | DTA 12 |||| DTA 13 |||| DTA 14 |||| DTA 15 ||||
| 49 | OVFC ||||||| DTAC ||||||| NCID ||
| 50 | NETWORK CALL IDENTIFIER (NCID) ||||||||||||||||
| 51 | NETWORK CALL IDENTIFIER (NCID) ||||||||||||||||
| 52 | NETWORK CALL IDENTIFIER (NCID) ||||||||||||||||
| 53 | NETWORK CALL IDENTIFIER (NCID) ||||||||||||||||
| 54 | NETWORK CALL IDENTIFIER (NCID) ||||||||||||||||
| 55 | T&C ROOM 1 |||||||| T&C ROOM 2 ||||||||
| 56 | T&C ROOM 3 |||||||| T&C ROOM 4 ||||||||
| 57 | T&C ROOM 5 |||||||| T&C ROOM 6 ||||||||
| 58 | EAC1 |||| EAC2 |||| EAC3 |||| EAC4 ||||
| 59 | EAC5 |||| EAC6 |||| EAC7 |||| EAC8 ||||
| 60 | EAC9 |||| EAC10 |||| EAC11 |||| EAC12 ||||
| 61 | OPIN ||||||||||||| OVFCS |||
| 62 | TP5 - OPERATOR RELEASE |||||||||||||||
| 63 | RN1 |||| RN2 |||| RN3 |||| RN4 ||||

*FIG. 6B*

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CRID ||||| SYNC WORD (MINUS 2, OCTAL 7776) |||||||||||
| 01 | CDID, CALL DISCONNECT I.D. NUMBER (0–15) ||||||||||||||||
| 02 | CDID, CALL DISCONNECT I.D. NUMBER (16–31) ||||||||||||||||
| 03 | SWID 1 ||||| SWID 2 ||||| SWID 3 ||||||
| 04 | ST – SWITCH TYPE ||||||| EQ – EVENT QUALIFIER |||||||||
| 05 | SERET – SER EVENT TIME (0–15) ||||||||||||||||
| 06 | SERET – SER EVENT TIME (16–31) ||||||||||||||||
| 07 | |||| FCDID – FIRST RECORD CDID (12 LSBs) ||||||||||||
| 08 | |||| LCDID – LAST RECORD CDID (12 LSBs) ||||||||||||
| 09 | |||| NCDID – NEXT RECORD CDID (12 LSBs) ||||||||||||
| 10 | NBSN – NEMAS BLOCK SEQUENCE NUMBER ||||||||||||||||
| 11 | PT – PREVIOUS TIME (0–15) ||||||||||||||||
| 12 | PT – PREVIOUS TIME (16–31) ||||||||||||||||
| 13 | SI | TIME OFFSET |||||||||| ||||
| 14 | ||||||||||||||||
| 15 | ||||||||||||||||
| 16 | SOFTWARE LOAD ID1 ||||||| SOFTWARE LOAD ID2 |||||||||
| 17 | SOFTWARE LOAD ID3 ||||||| SOFTWARE LOAD ID4 |||||||||
| 18 | SOFTWARE LOAD ID5 ||||||| SOFTWARE LOAD ID6 |||||||||
| 19 | LAST PATCH#/PR RLS1 ||||||| LAST PATCH#/PR RLS2 |||||||||
| 20 | QCDR |||||| QECDR |||||| ||||
| 21 | QPNR |||||| QEPNR |||||| ||||
| 22 | QOSR |||||| QEOSR |||||| ||||
| 23 | QPOSR |||||| QEPOSR |||||| ||||
| 24 | QSER |||||| CHFN ||||||| SU |
| 25 | CDR THROTTLE START TIME (0–15) ||||||||||||||||
| 26 | CDR THROTTLE START TIME (16–31) ||||||||||||||||
| 27 | CDR THROTTLE STOP TIME (0–15) ||||||||||||||||
| 28 | CDR THROTTLE STOP TIME (16–31) ||||||||||||||||
| 29 | |||||||||||| FORMAT VER. ||||
| 30 | THROTTLE COUNT (0–15) ||||||||||||||||
| 31 | THROTTLE COUNT (16–31) ||||||||||||||||
| BITS | 00 | 01 | 02 | 03 | 04 | 05 | 06 | 07 | 08 | 09 | 10 | 11 | 12 | 13 | 14 | 15 |

*FIG. 7*

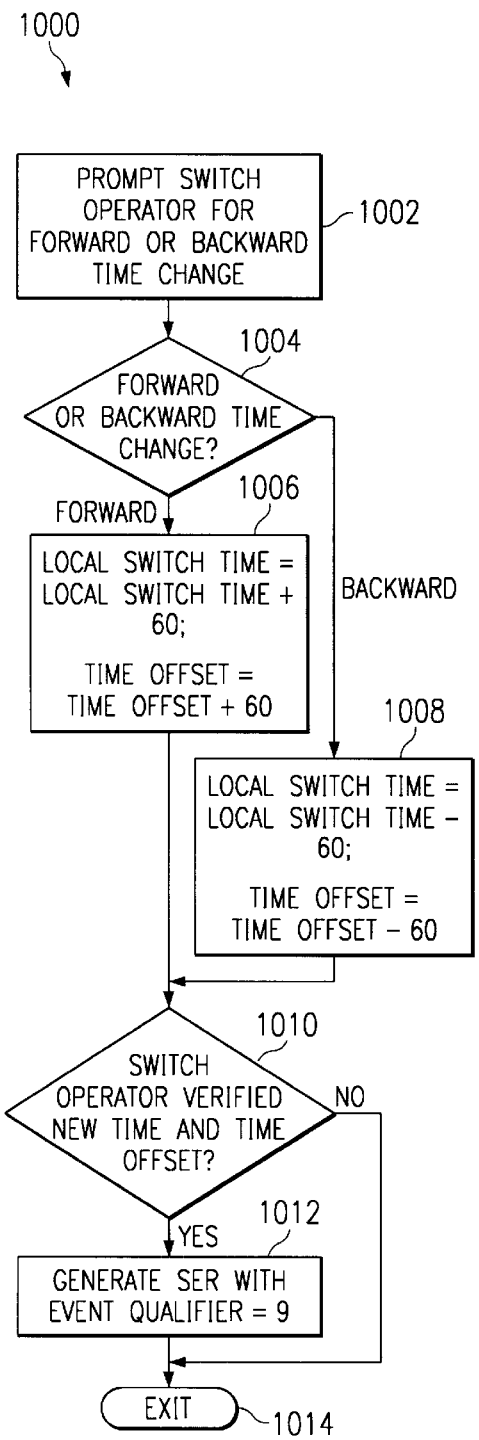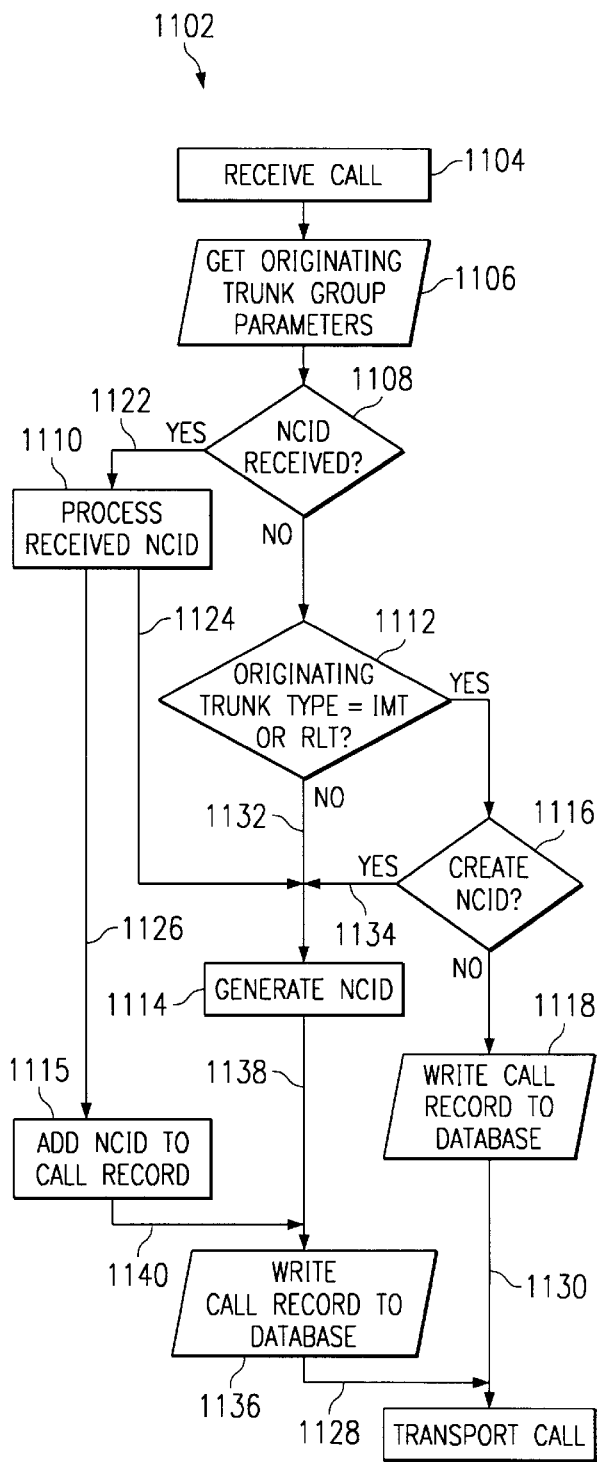
FIG. 10
FIG. 11

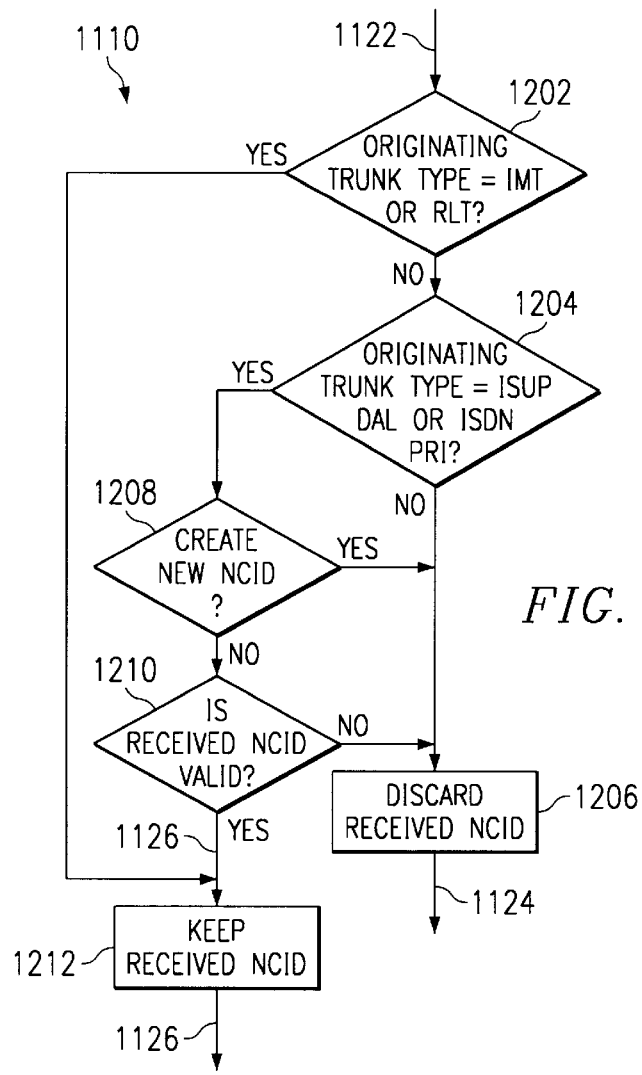
FIG. 12
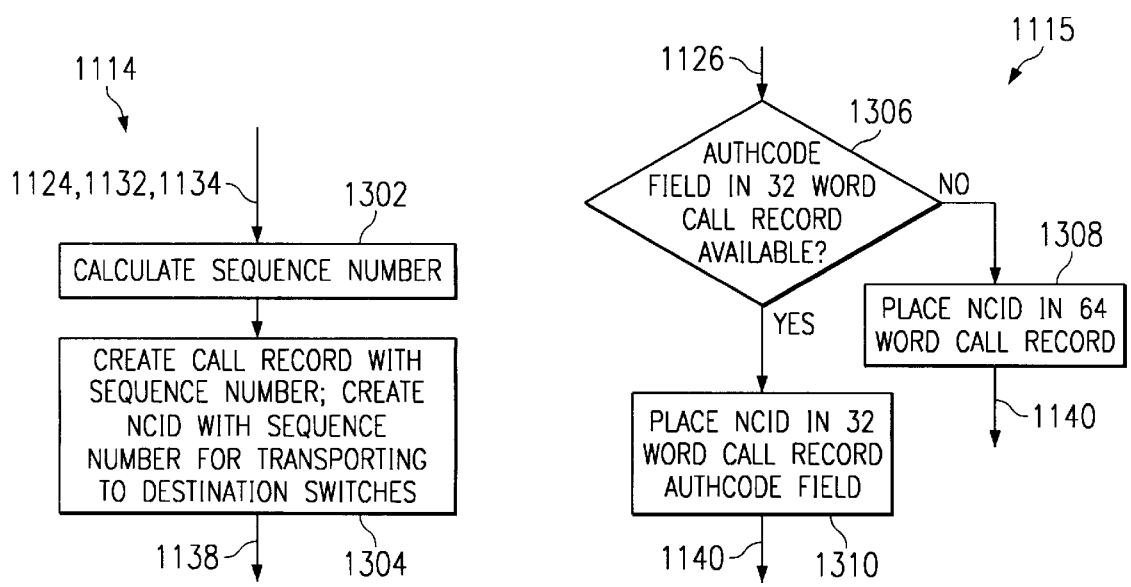
FIG. 13A
FIG. 13B

5,852,659

SYSTEM AND METHOD FOR IMPROVED BILLING RECORDS

BACKGROUND OF THE INVENTION

1. Field of the Invention

This invention relates generally to telecommunication networks, and more specifically, to switches of a telecommunication network that generate call records using a flexible and expandable record format, and that generate a unique call identifier for each telephone call that traverses the network.

2. Related Art

A typical telecommunication network comprises multiple telecommunication switches located throughout a geographical area. When a user makes a call, the call may be routed through one or more switches before reaching its destination.

FIG. 1 illustrates an exemplary telecommunications system 102 across the United States. For purposes of illustration, a caller 104 places a call from Los Angeles, Calif. to a party 112 located in New York City, N.Y. Such a call is typically transmitted across three (3) switches: the Los Angeles, Calif. switch 106; the Chicago, Ill. switch 108; and the New York City, N.Y. switch 110. In this scenario, the originating switch is the Los Angeles, Calif. switch 106, and the terminating switch is the New York City, N.Y. switch 110.

Each switch 106–110 is connected to two (2) or more Data Access Points (DAP) 116–120, a primary DAP 116–120 and a backup DAP 116. A DAP 116–120 is a facility that receives requests for information from the switches 106–110, processes the requests, and returns the requested information back to the requesting switch 106–110. The switches 106–110 use information from the DAPs 116–120 to process calls through the network.

When a call passes through a switch 106–110, the switch 106–110 creates a call record. The call record contains information on the call, including but not limited to: routing, billing, call features, and trouble shooting information. After the call is terminated, each switch 106–110 that processed the call completes the associated call record. The switches 106–110 combine multiple call records into a billing block. When a switch 106–110 fills the billing block, the switch 106–110 sends the billing block to a billing center 114. Thus, the billing center 114 receives one billing block from each switch 106–110 that handled the call, which in this case would be three billing blocks. The billing center 114 searches each billing block and retrieves the call record associated with the call, thereby retrieving one call record per switch 106–110 that handled the call. The billing center 114 then uses one or more of the retrieved call records to generate a billing entry. The billing center 114 is also connected to each DAP 116–120 to retrieve information regarding a switch 106–110 or call record.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record increases unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises with using only local switch time in that there is no accommodation for time changes due to daylight savings time. Additionally, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

Requirements also exist for matching all of the call records associated with a specific telephone call. For example, for proper billing and cost control, it is necessary for the billing center to match the originating switch's call record to the terminating switch's call record. Additionally, for troubleshooting and security purposes, it may be necessary to trace a specific telephone call easily through the network in order to identify problem areas.

Therefore, there is a need for switches of a telecommunications network to uniquely identify each telephone call that traverses the network, thereby uniquely identifying all of the call records associated with a specific telephone call.

SUMMARY OF THE INVENTION a. Call Record Format

This invention solves the problems of providing a flexible and expandable call record format by implementing both a small and large call record format. In particular, the embodiment of the present invention implements a preferably 32 and 64 word call record format. The invention uses a 32-word call record format for the typical telephone call, which comprises the majority of all telephone calls, and uses a 64-word call record format when additional information is needed regarding the call. This implementation provides the flexibility needed to efficiently manage varying data requirements of a call record. New call features can be developed and easily incorporated into the variable call record format of the present invention.

This invention also records timepoints in the epoch time format. The invention records the origination time of a call in epoch time format and the remaining timepoints are offsets, or the number of seconds, from that origination time. This embodiment solves the problems associated with converting from/to daylight savings time because daylight savings time is simply a local time offset and does not effect the epoch time. Additionally, the timepoints in epoch time format require less space in the call record than local switch time format.

The epoch time format may represent coordinated universal time (UTC), as determined at Greenwich, England which has a time zone of zero (0), local switch time or any other time. Epoch time is just a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

b. Network Call Identifier

This invention solves the problem of uniquely identifying each telephone call and all of the call records associated with a specific telephone call by providing a unique identifier to each call record. This invention generates a network call identifier (NCID) that is assigned to each call record at the point of call origination, that is, the originating switch generates a NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This invention also provides the switch capability of discarding a received NCID and generating a new NCID. A switch discards a received NCID if the NCID format is invalid or unreliable, thereby ensuring a valid unique identifier to be associated with each call going through the network. An NCID may be unreliable if generated by third party switches in the telecommunications network.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 illustrates the CDR and PNR call record formats;

FIGS. 4(A) and 4(B) collectively illustrate the ECDR and EPNR call record formats;

FIG. 5 illustrates the OSR and POSR call record formats;

FIGS. 6(A) and 6(B) collectively illustrate the EOSR and EPOSR call record formats;

FIG. 7 illustrates the SER record format;

FIG. 10 is a control flow diagram illustrating the Change Daylight Savings Time command;

FIG. 11 is a control flow diagram illustrating the Network Call Identifier (NCID) switch call processing;

FIG. 12 is a control flow diagram illustrating the processing of a received Network Call Identifier;

FIG. 13(A) is a control flow diagram illustrating the generating of a Network Call Identifier;

FIG. 13(B) is a control flow diagram illustrating the adding of a Network Call Identifier to a call record.

DETAILED DESCRIPTION OF THE PREFERRED EMBODIMENTS

The present invention relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The present invention also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 1:
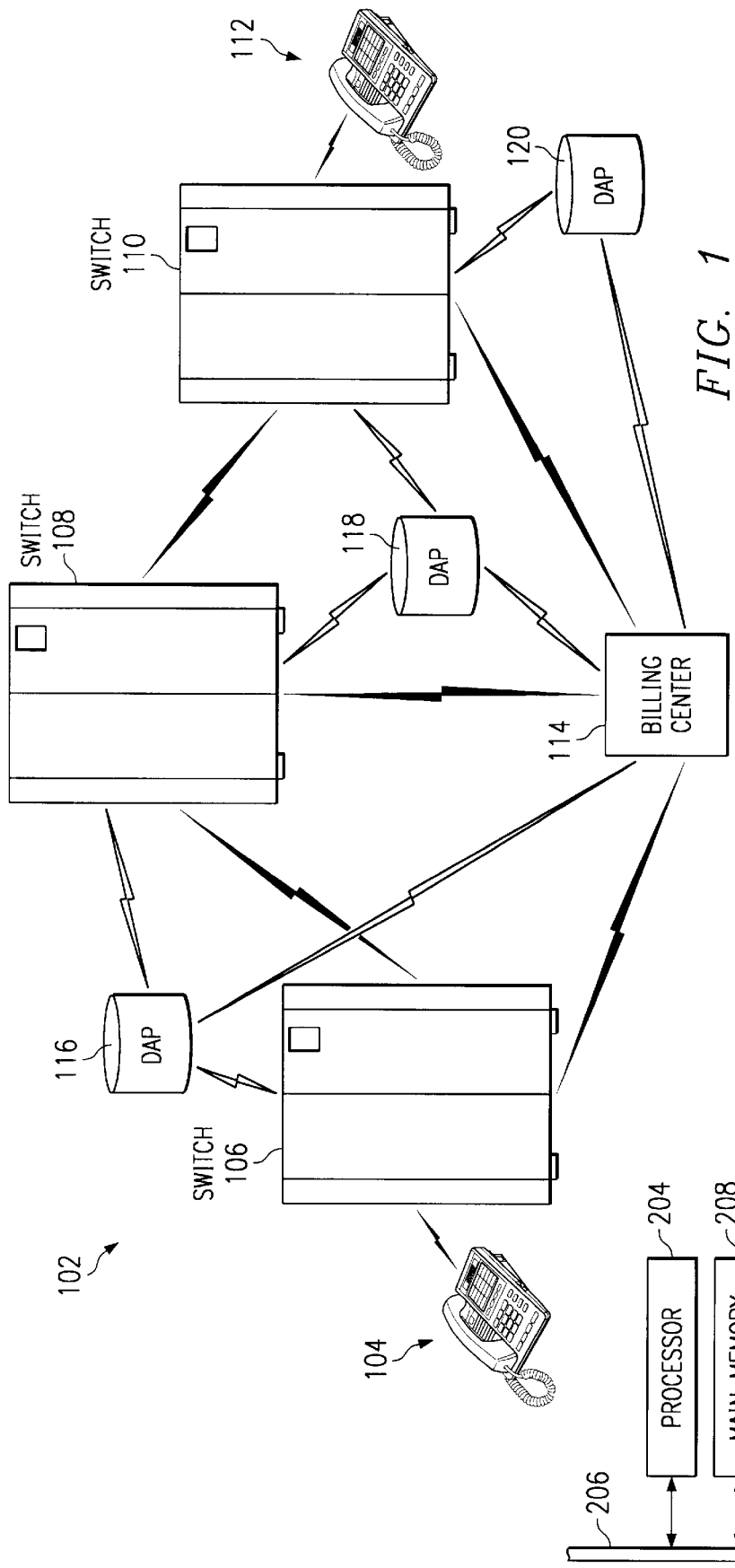
FIG. 1 is a block diagram of an exemplary telecommunications system.
Figure 2:
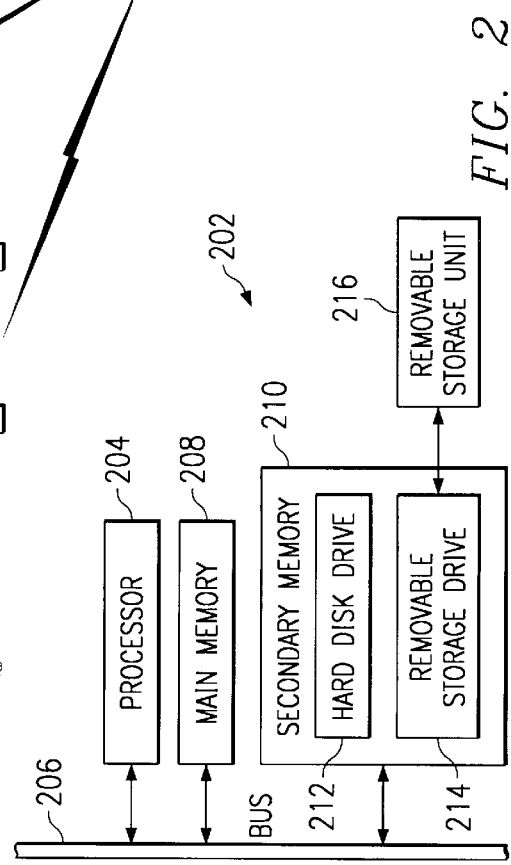
FIG. 2 is a block diagram of an exemplary computer system.

The chosen embodiment of the present invention is computer software executing within a computer system. FIG. 2 shows an exemplary computer system. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

a. Call Record Format

This invention provides the switches of a telecommunication network with nine (9) different record formats. These records include : Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). MCI Communications Corporation (MCI) currently uses these record formats and describes them in detail in the MCI documents *MCI 32/64-Word Billing Record Format Specification,* 007-0001-09.8F-ES, revision 9.8, Aug. 31, 1995 which is incorporated herein by reference in its entirety. Each record is 32-words in length and the expanded version of each record is 64 words in length.

Example embodiments of the nine (9) call record formats discussed herein are further described in Tables 1–5 of the Appendix. The Appendix, and these Tables in the Appendix, form a part of this application and are self-explanatory. The embodiments of the call records of the present invention comprise both 32 word and 64 word call record formats. It would be apparent to one skilled in the relevant art to develop alternative embodiments for call records comprising a different number of words and different field definitions. Table 1 of the Appendix contains an example embodiment of the CDR and PNR call record formats. FIG. 3 shows a graphical representation of the CDR and PNR call record formats. Table 2 of the Appendix contains an example embodiment of the ECDR and EPNR call record formats. FIGS. 4(A) and 4(B) show a graphical representation of the ECDR and EPNR call record formats. Table 3 of the Appendix contains an example embodiment of the OSR and POSR call record formats. FIG. 5 shows a graphical representation of the OSR and POSR call record format. Table 4 of the Appendix contains an example embodiment of the EOSR and EPOSR call record formats. FIGS. 6(A) and 6(B) show a graphical representation of the EOSR and EPOSR call record formats. Table 5 of the Appendix contains an example embodiment of the SER record format. FIG. 7 shows a graphical representation of the SER record format.

The CDR and PNR, thereby the ECDR and EPNR, are standard call record formats and contain information regarding a typical telephone call as it passes through a switch. The CDR is used for a non-VNet customer, whereas the PNR is used for a VNet customer and is generated at switches which originate VNet calls. The fields of these two records are identical except for some field-specific information which is described below.

The OSR and POSR, thereby the EOSR and EPOSR, contain information regarding a telephone call requiring operator assistance and are generated at switches or systems actually equipped with operator positions. A switch completes an OSR for a non-VNet customer and completes a POSR for a private VNet customer. These records are only generated at switches or systems that have the capability of performing operator services or network audio response system (NARS) functions. The formats of the two (2) records are identical except for some field-specific information which is described below.

A SER is reserved for special events such as the passage of each hour mark, time changes, system recoveries, and at the end of a billing block. The SER record format is described in more detail below.

Figure 8A:
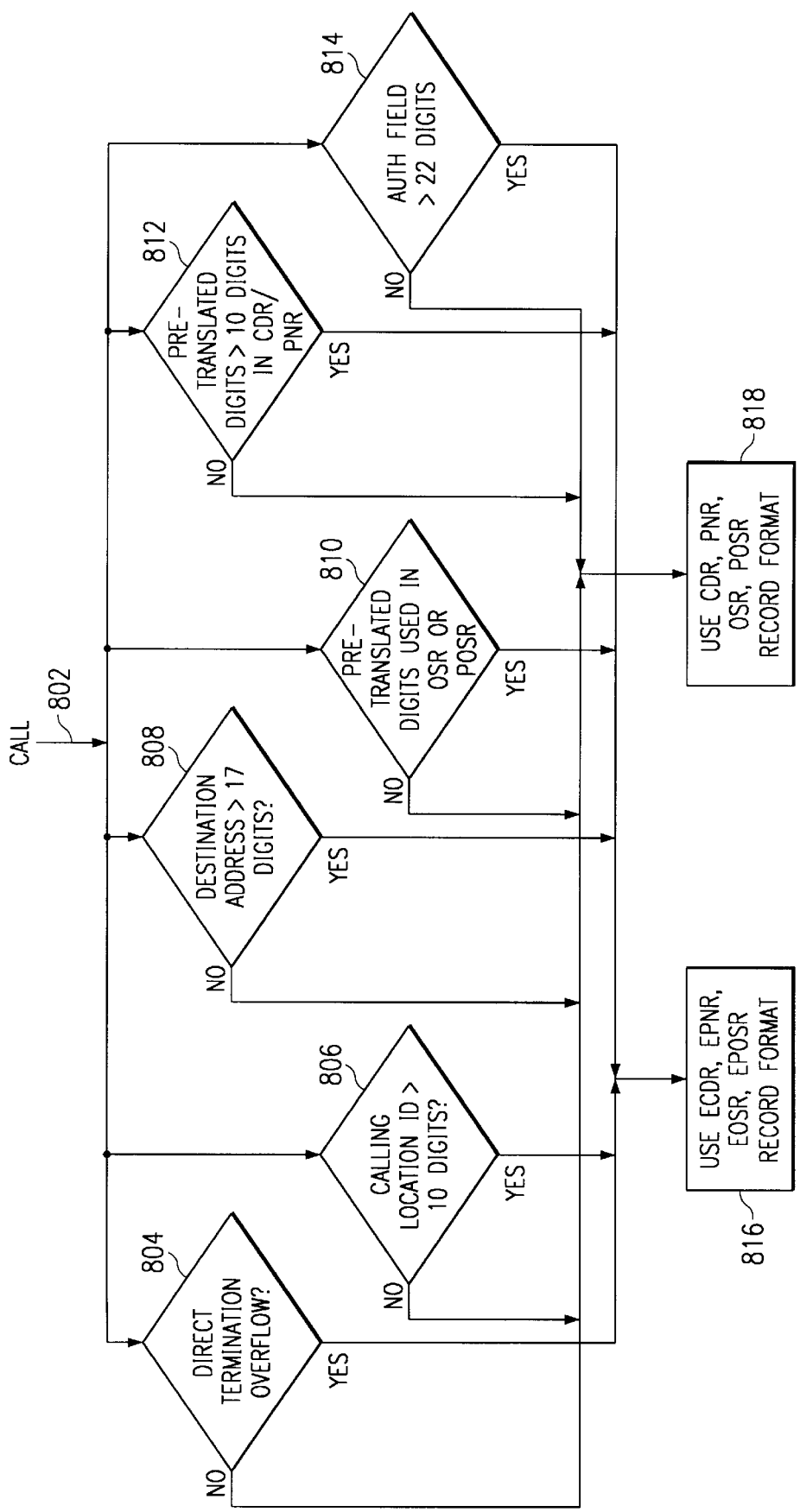
FIGS. 8(A) and 8(B) are control flow diagrams illustrating when a switch uses the expanded record format.
Figure 8B:
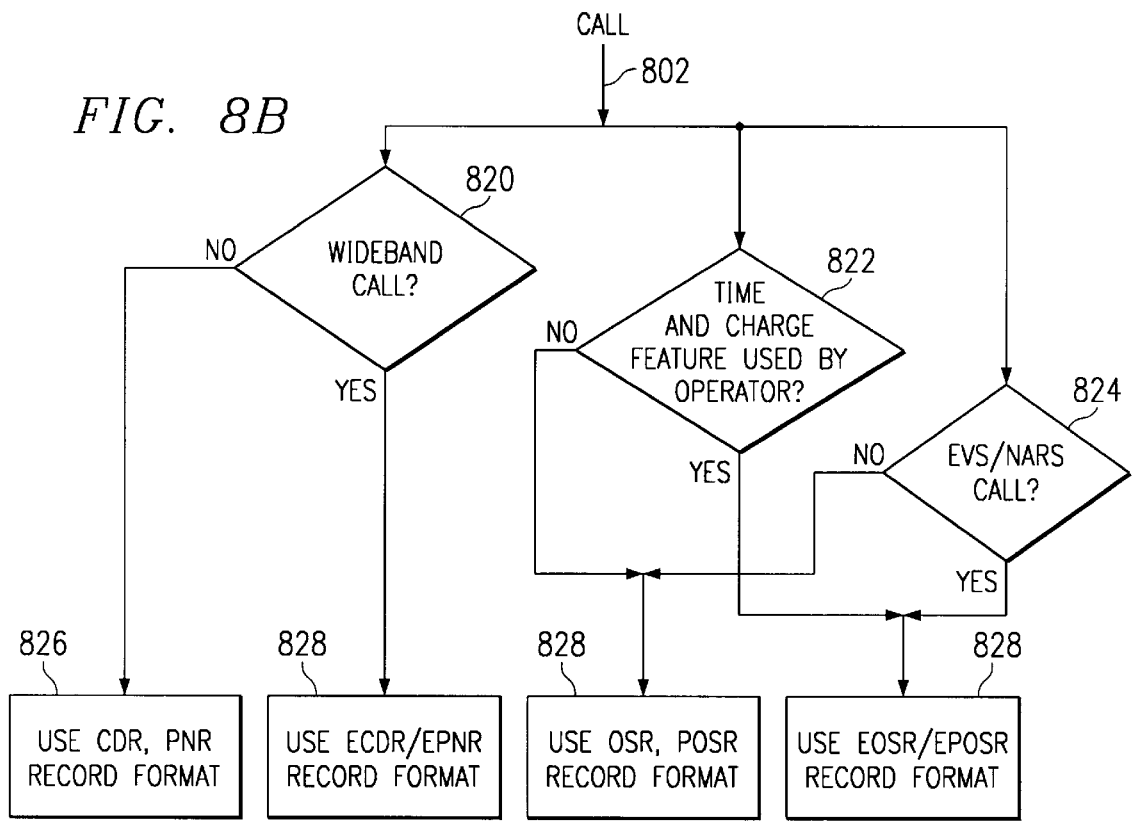

FIGS. 8(A) and 8(B) collectively illustrate the logic that a switch uses to determine when to use an expanded version of a record format. A call 802 comes into a switch 106–110 (called the current switch for reference purposes; the current switch is the switch that is currently processing the call), at which time the switch 106–110 determines what call record and what call record format (small/default or large/expanded) to use for the call's 802 call record. In this regard, the switch 106–110 makes nine (9) checks for each call 802 that it receives. The switch 106–110 uses an expanded record for a call 802 that passes any check, as well as, for a call 802 that passes any combination of checks.

The first check 804 determines if the call is involved in a direct termination overflow (DTO) at the current switch 106–110. For example, a DTO occurs when a customer makes a telephone call 802 to an 800 number and the original destination of the 800 number is busy. If the original destination is busy, the switch overflows the telephone call 802 to a new destination. In this case, the switch must record the originally attempted destination, the final destination of the telephone call 802, and the number of times of overflow. Therefore, if the call 802 is involved in a DTO, the switch 106–110 must complete an expanded record (ECDR, EPNR, EOSR, EPOSR) 816; otherwise, the switch 106–110 uses the default record format (CDR, PNR, OSR, POSR) 818.

The second check 806 made on a call 802 by a switch 106–110 determines if the calling location of the call 802 is greater than ten (10) digits. The calling location is the telephone number of the location from where the call 802 originated. Such an example is an international call which comprises at least eleven (11) digits. If the calling location is greater than ten (10) digits, the switch records the telephone number of the calling location in an expanded record (ECDR, EPNR, EOSR, EPOSR) 816; otherwise, the switch 106–110 uses the default record format (CDR, PNR, OSR, POSR) 818.

A switch 106–110 makes a third check 808 on a call 802 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 816; otherwise, the switch 106–110 uses the default record format (CDR, PNR, OSR, POSR) 818.

A switch 106–110 makes a fourth check 810 on a call 802 to determine if the pre-translated digits field is used with an operator assisted service call. The pretranslated digits are the numbers of the call 802 as dialed by a caller if the call 802 must be translated to another number within the network. Therefore, when a caller uses an operator service, the switch 106–110 records the dialed numbers in expanded record (EOSR, EPOSR) 816; otherwise, the switch 106–110 uses the default record format (OSR, POSR) 818.

In a fifth check 812 on a call 802, a switch 106–110 determines if the pretranslated digits of a call 802 as dialed by a caller without operator assistance has more than ten (10) digits. If there are more than ten (10) pre-translated digits, the switch 106–110 records the dialed numbers in expanded record (ECDR, EPNR) 816; otherwise, the switch 106–110 uses the default record format (CDR, PNR) 818.

In a sixth check 814 on a call 802, a switch 106–110 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 106–110 records the billing information in an expanded record (ECDR, EPNR, EOSR, EPOSR) 816; otherwise, the switch 106–110 uses the default record format (CDR, PNR, OSR, POSR) 818.

In a seventh check 820 on a call 802, a switch 106–110 determines if the call 802 is a wideband call. A wideband call is one that requires multiple transmission lines, or channels. For example, a typical video call requires six (6) transmission channels: one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 828. If the call 802 is not a wideband call, the switch 106–110 may use the default record format (CDR, PNR) 826.

In an eighth check 822 on a call 802, a switch 106–110 determines if the time and charges feature was used by an operator. The time and charges feature is typically used in a hotel scenario when a hotel guest makes a telephone call using the operator's assistance and charges the call 802 to her room. After the call 802 has completed, the operator informs the hotel guest of the charge, or cost, of the call 802. If the time and charges feature was used with a call 802, the switch 106–110 records the hotel guest's name and room number in an expanded record (EOSR, EPOSR) 832. If the call did not use the time and charges feature, the switch 106–110 uses the default record format (OSR, POSR) 830.

The ninth, and final, check 824 made on a call 802 by a switch 106–110 determines if the call 802 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVS/NARS call 802, the NARS switch 106–110 records the customer's menu selections in an expanded record (EOSR, EPOSR) 832. If the call did not involve a EVS/NARS, the switch 106–110 uses the default record format (OSR, POSR) 830.

Once the checks have been made against a call, a switch generates and completes the appropriate call record. Call record data is recorded in binary and Telephone Binary Coded Decimal (TBCD) format. TBCD format is illustrated below:

0000=TBCD-Null
0001=digit 1
0010=digit 2
0011=digit 3
0100=digit 4
0101=digit 5
0110=digit 6
0111=digit 7
1000=digit 8
1001=digit 9
1010=digit 0
1011=special digit 1 (DTMF digit A)
1100=special digit 2 (DTMF digit B)
1101=special digit 3 (DTMF digit C)
1110=special digit 4 (DTMF digit D)
1111=special digit 5 (Not Used)

All TBCD digit fields must be filled with TBCD-Null, or zero, prior to data being recorded. Where applicable, dialed digit formats conform to these conventions:

N=digits 2–9
X=digits 0–9
Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments since a particular date/time in history. The embodiment of the present invention uses a date/time of midnight (00:00 am UTC) on Jan. 1, 1976. It would be readily apparent to one skilled in the relevant art to implement an epoch time based on another date/time. In the records, Timepoint 1 represents the epoch time that is the origination time of the call 802. The other timepoint stored in the records are the number of seconds after Timepoint 1, that is, they are offsets from Timepoint 1 that a particular timepoint occurred. All of the timepoint fields must be filled in with "0's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time which in this embodiment is UTC. The Time offset is a number reflecting the switch time relative to the UTC, that is, the offset due to time zones and, if appropriate, daylight savings time changes. There are three factors to consider when evaluating time change relative to UTC. First, there are time zones on both sides of UTC, and therefore have both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Third, there are many areas of the world that have time zones that are not in exact one-hour increments. For example, Australia has one time zone that has a thirty (30) minute difference from the two time zones on either side of it, and Northern India has a time zone that is fifteen (15) minutes after the one next to it. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.
i) Epoch Time+(Sign Bit*Time Offset)=Local Switch Time
ii) Local Switch Time−(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours*60 minutes/hour=360 minutes). See Table 5 of the Appendix for more details on the SER record format. When recording Timepoint 1 in the call record, the switch multiplies the Time Offset by 60, because there are 60 seconds in each 1 minute increment, and determines whether the offset is positive or negative by checking the Sign Bit. This example results in a value of −21,600 (−1*360 minutes*60 seconds/minute=−21,600 seconds). Using equation (ii) from above, if the local switch time were midnight, the corresponding epoch time might be, for example, 1,200,000,000. Subtracting the Time Offset of −21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 9:
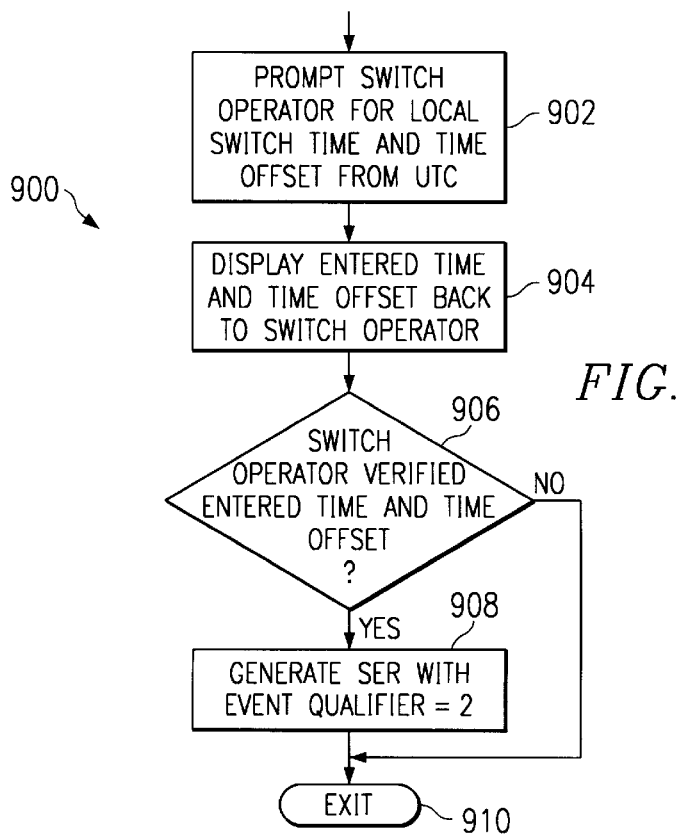
FIG. 9 is a control flow diagram illustrating the Change Time command.

Two commands are used when changing time. First, FIG. 9 illustrates the control flow of the Change Time command 900 which changes the Local Switch Time and the Time Offset. In FIG. 9, after a switch operator enters the Change Time command, the switch enters step 902 and prompts the switch operator for the Local Switch Time and Time Offset from UTC. In step 902 the switch operator enters a new Local Switch Time and Time Offset. Continuing to step 904, the new time and Time Offset are displayed back to the switch operator. Continuing to step 906, the switch operator must verify the entered time and Time Offset before the actual time and offset are changed on the switch. If in step 906 the switch operator verifies the changes, the switch proceeds to step 908 and generates a SER with an Event Qualifier equal to 2 which identifies that the change was made to the Local Switch Time and Time Offset of the switch. The billing center uses the SER for its bill processing. The switch proceeds to step 910 and exits the command. Referring back to step 906, if the switch operator does not verify the changes, the switch proceeds to step 910 and exits the command without updating the Local Switch Time and Time Offset. For more information on SER, see Table 5 in the Appendix.

FIG. 10 illustrates the control flow for the Change Daylight Savings Time command 1000 which is the second command for changing time. In FIG. 10, after a switch operator enters the Change Daylight Savings Time command, the switch enters step 1002 and prompts the switch operator to select either a Forward or Backward time change. Continuing to step 1004, the switch operator makes a selection. In step 1004, if the switch operator selects the Forward option, the switch enters step 1006. In step 1006, the switch sets the Local Switch Time forward one hour and adds one hour (count of 60) to the Time Offset. The switch then proceeds to step 1010. Referring back to step 1004, if the switch operator selects the Backward option, the switch sets the Local Switch Time back one hour and subtracts one hour (count of 60) from the Time Offset. The switch then proceeds to step 1010.

In step 1010, the switch operator must verify the forward or backward option and the new Local Switch Time and Time Offset before the actual time change takes place. If in step 1010, the switch operator verifies the new time and Time Offset, the switch proceeds to step 1012 and generates a SER with an Event Qualifier equal to 9 which changes the Local Switch Time and Time Offset of the switch. The switch proceeds to step 1014 and exits the command. Referring back to step 1010, if the switch operator does not verify the changes, the switch proceeds to step 1014 and exits the command without updating the Local Switch Time and Time Offset.

After the successful completion of a Change Daylight Savings Time Command, the billing records are affected by the new Time Offset. This embodiment allows the epoch time, used as the billing time, to increment normally through the daylight savings time change procedure, and not to be affected by the change of Local Switch Time and Time Offset.

b. Network Call Identifier

This invention provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits): This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID;

ii) Originating Trunk Group (14 bits): This field represents the originating trunk group as defined in the 32/64 word call record format described above;

iii) Originating Port Number (19 bits): This field represents the originating port number as defined in the 32/64 word call record format described above;

iv) Timepoint 1 (32 bits): This field represents the Timepoint 1 value as defined in the 32/64 word call record format described above; and v) Sequence Number (3 bits): This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format.

Each switch records the NCID in either the 32 or 64 word call record format. Regarding the 32 word call record format, intermediate and terminating switches will record the NCID in the Authcode field of the 32 word call record if the Authcode filed is not used to record other information. In this case, the Originating Switch ID is the NCS Switch ID, not the alphanumeric Switch ID as recorded in the SER call record. If the Authcode is used for other information, the intermediate and terminating switches record the NCID in the 64 word call record format. In contrast, originating switches do not use the Authcode field when storing an NCID in a 32 word call record. Originating switches record the subfields of the NCID in the corresponding separate fields of the 32 word call record. That is, the Originating Switch ID is stored as an alphanumeric Switch ID in the Switch ID field of the SER call record; the Originating Trunk Group is stored in the Originating Trunk Group field of the 32 word call record; the Originating Port Number is stored in the Originating Port field of the 32 word call record; the Timepoint 1 is stored in the Timepoint 1 field of the 32 word call record; the Sequence Number is stored in the NCID Sequence Number field of the 32 word call record. The 32 word call record also includes a NCID Location (NCIDLOC) field to identify when the NCID is recorded in the Authcode field of the call record. If the NCID Location field contains a '1,' then the Authcode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32 word call record.

Regarding the 64 word call record format, the expanded call record includes a separate field, call the NCID field, to store the 82 bits of the NCID. This call record is handled the same regardless of whether an originating, intermediate, or terminating switch stores the NCID. In the 64 word call record format, the Originating Switch ID is the NCS Switch ID, not the alphanumeric Switch ID as recorded in the SER call record.

FIG. 11 illustrates the control flow of the Network Call Identifier switch call processing. A call 802 comes into a switch 106–110 (called the current switch for reference purposes; the current switch is the switch that is currently processing the call) at step 1104. In step 1104, the current switch receives the call 802 and proceeds to step 1106. In step 1106, the current switch accesses a local database and gets the trunk group parameters associated with the originating trunk group of the call 802. After getting the parameters, the current switch proceeds to step 1108. In step 1108, the current switch determines if it received an NCID with the call 802. If the current switch did not receive an NCID with the call 802, the switch continues to step 1112.

In step 1112, the switch analyzes the originating trunk group parameters to determine the originating trunk group type. If the originating trunk group type is an intermachine trunk (IMT) or a release link trunk (RLT), then the switch proceeds to step 1116. An IMT is a trunk connecting two normal telecommunication switches, whereas a RLT is a trunk connecting an intelligent service network (ISN) platform to a normal telecommunication switch. When the current switch reaches step 1116, the current switch knows that it is not an originating switch and that it has not received an NCID. In step 1116, the current switch analyzes the originating trunk group parameters to determine whether it is authorized to create an NCID for the call 802. In step 1116, if the current switch is not authorized to create an NCID for the call 802, the current switch proceeds to step 1118. When in step 1118, the current switch knows that it is not an originating switch, it did not receive an NCID for the call 802, but is not authorized to generate an NCID. Therefore, in step 1118, the current switch writes the call record associated with the call 802 to the local switch database and proceeds to step 1120. In step 1120, the current switch transports the call 802 out through the network with its associated NCID. Step 1120 is described below in more detail.

Referring again to step 1116, if the current switch is authorized to create an NCID for the call 802, the current switch proceeds to step 1114. In step 1114, the current switch generates a new NCID for the call 802 before continuing to step 1136. In step 1136, the current switch writes the call record, including the NCID, associated with the call 802 to the local switch database and proceeds to step 1120. In step 1120, the current switch transports the call 802 out through the network with its associated NCID. Step 1120 is described below in more detail.

Referring again to step 1112, if the current switch determines that the originating trunk group type is not an IMT or RLT, the current switch proceeds to step 1114. When reaching step 1114, the current switch knows that it is an originating switch and, therefore, must generate a NCID for the call 802. Step 1114 is described below in more detail. After generating a NCID in step 1114, the current switch proceeds to step 1136 to write the call record, including the NCID, associated with the call 802 to the local database. After writing the call record, the current switch proceeds to step 1120 to transport the call out through the network with its associated NCID. Step 1120 is also described below in more detail.

Referring again to step 1108, if the current switch determines that it received an NCID with the call 802, the current switch proceeds to step 1110. In step 1110, the current switch processes the received NCID. In step 1110, there are two possible results. First, the current switch may decide not to keep the received NCID thereby proceeding from step 1110 to step 1114 to generate a new NCID. Step 1110 is described below in more detail. In step 1114, the current switch may generate a new NCID for the call 802 before continuing to step 1136. Step 1114 is also described below in more detail. In step 1136, the current switch writes the call record associated with the call 802 to the local database. The current switch then proceeds to step 1120 and transports the call 802 out through the network with its associated NCID. Step 1120 is also described below in more detail.

Referring again to step 1110, the current switch may decide to keep the received NCID thereby proceeding from step 1110 to step 1115. In step 1115, the current switch adds the received NCID to the call record associated with the call 802. Steps 1110 and 1115 are described below in more detail. After step 1115, the current switch continues to step 1136 where it writes the call record associated with the call 802 to the local database. The current switch then proceeds to step 1120 and transports the call 802 out through the network with its associated NCID. Step 1120 is also described below in more detail.

FIG. 12 illustrates the control logic for step 1110 which processes a received NCID. The current switch enters step 1202 of step 1110 when it determines that an NCID was received with the call 802. In step 1202, the current switch analyzes the originating trunk group parameters to determine the originating trunk group type. If the originating trunk group type is an IMT or RLT, then the current switch proceeds to step 1212. When in step 1212, the current switch knows that it is not an originating switch and that it received an NCID for the call 802. Therefore, in step 1212, the current switch keeps the received NCID and exits step 1110, thereby continuing to step 1115 in FIG. 11 where the current switch will store the received NCID in the call record and transport the call.

Referring again to step 1202, if the originating trunk group type is not an IMT or RLT, the current switch proceeds to step 1204. In step 1204, the current switch determines if the originating trunk group type is an Integrated Services User Parts Direct Access Line (ISUP DAL) or an Integrated Services Digital Network Primary Rate Interface (ISDN PRI). ISUP is a signalling protocol which allows information to be sent switch-to-switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 1204, if the current switch determines that the trunk group type is not an ISUP DAL or ISDN PRI, the current switch proceeds to step 1206. When in step 1206, the current switch knows that it received an NCID that was not generated by a switch that is part of the telecommunication network or by a switch that is a customer of the network. Therefore, in step 1206, the current switch discards the received NCID because it is an unreliable NCID. From step 1206, the current switch exits step 1110, thereby continuing to step 1114 in FIG. 11 where the current switch will create a new NCID and transport that NCID with the call 802.

Referring back to step 1204, if the current switch determines that the originating trunk group type is an ISUP DAL or ISDN PRI, the current switch continues to step 1208. When in step 1208, the current switch knows that it received an NCID from a customer trunk group. Therefore, the current switch analyzes the originating trunk group parameters to determine whether it is authorized to create a new NCID for the call 802. The current switch may be authorized to create a new NCID and overwrite the NCID provided by the customer to ensure that a valid NCID corresponds to the call 802 and is sent through the network. In step 1208, if the current switch is not authorized to create a new NCID for the call 802, the current switch proceeds to step 1210. In step 1210, the current switch checks the validity of the received NCID, for example, the NCID length. If the received NCID is invalid, the current switch proceeds to step 1206. In step 1206, the current switch discards the invalid NCID. From step 1206, the current switch exits step 1110, thereby continuing to step 1114 in FIG. 11 where the current switch will create a new NCID and transport that NCID with the call 802.

Referring again to step 1210, if the current switch determines that the received NCID is valid, the current switch proceeds to step 1212. In step 1212 the current switch keeps the received NCID and exits step 1110, thereby continuing to step 1115 in FIG. 11 where the current switch will store the received NCID in the call record and transport the call.

FIG. 13(A) illustrates the control logic for step 1114 which generates an NCID. The current switch enters step 1302 when an NCID must be created. In step 1302, the current switch will calculate a sequence number. The sequence number represents the number of calls which have occurred on the same port number with the same Timepoint 1 value. The first call has a sequence number value of '0,' after which the sequence number will increase incrementally for each successive call that originates on the same port number with the same Timepoint 1 value. After creating the sequence number in step 1302, the current switch proceeds to step 1304. In step 1304, the current switch creates a call record for the call 802 including in it the call's 802 newly created NCID. After the call record has been created, the current switch exits step 1114 and proceeds to step 1136 in FIG. 11 where the current switch writes the call record to the local switch database.

FIG. 13(B) illustrates the control logic for step 1115 which adds a received NCID to the call record associated with the call 802. Upon entering step 1115, the current switch enters step 1306. When in step 1306, the current switch knows that it has received a valid NCID from an intermediate or terminating switch, or from a customer switch. In step 1306, the current switch determines if the Authcode field of the 32 word call record is available for storing the NCID. If the Authcode field is available, the current switch proceeds to step 1310. In step 1310, the current switch stores the NCID in the Authcode field of the 32 word call record. The current switch must also set the NCID Location field to the value '1' which indicates that the NCID is stored in the Authcode field. After step 1310, the current switch exits step 1115 and continues to step 1136 in FIG. 11 where the current switch writes the call record to the local switch database.

Referring again to step 1306, if the Authcode field is not available in the 32 word call record, the current switch proceeds to step 1308. In step 1308, the current switch stores the NCID in the NCID field of the 64 word call record. After step 1308, the current switch exits step 1115 and continues to step 1136 in FIG. 11 where the current switch writes the call record to the local switch database.

Figure 14:
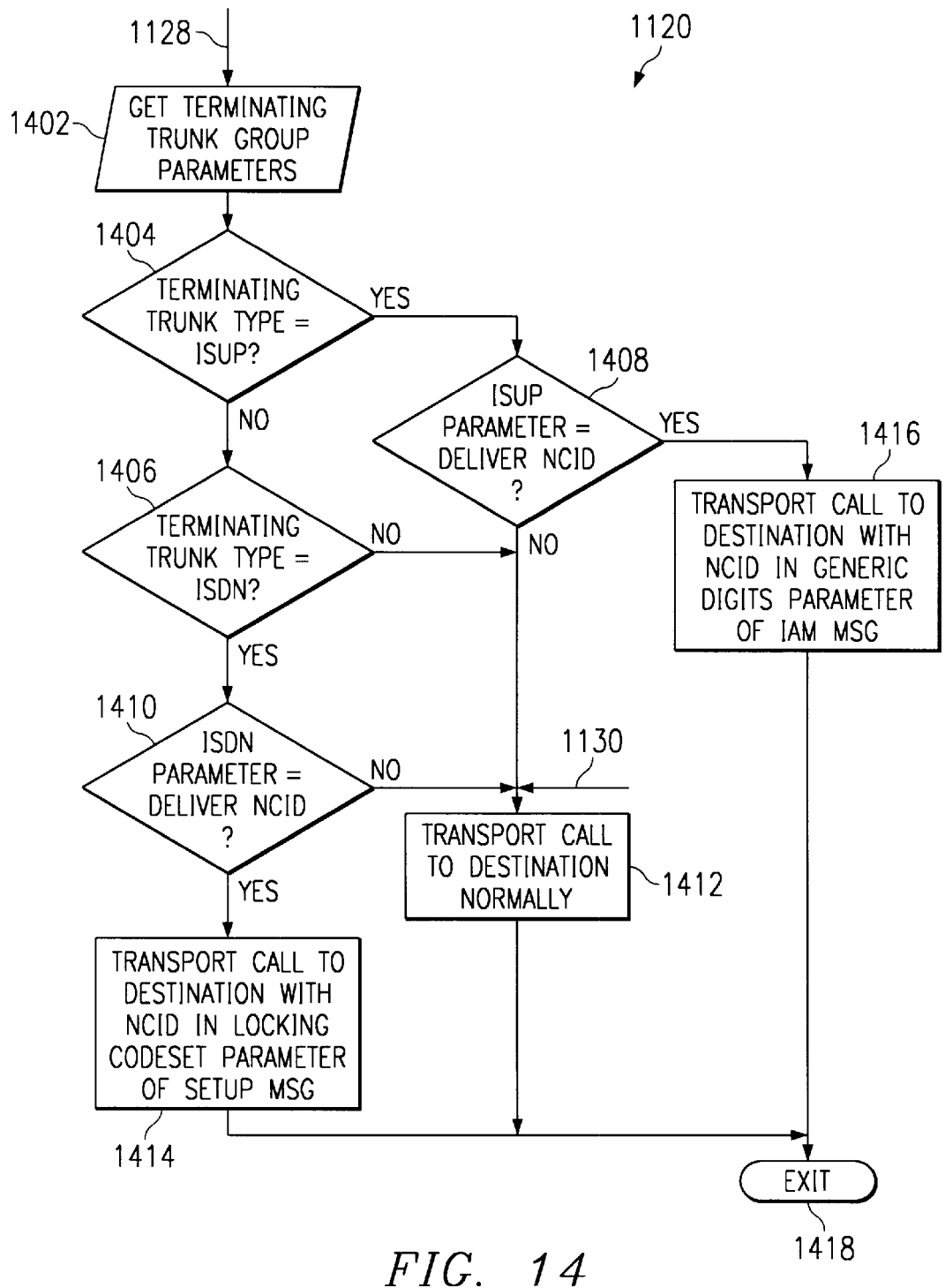
FIG. 14 is a control flow diagram illustrating the transporting of a call.

FIG. 14 illustrates the control logic for step 1120 which transports the call from the current switch. There are two entry points for this control logic: steps 1402 and 1412. Upon entering step 1402 from step 1136 on FIG. 11, the current switch knows that it has created an NCID or has received a valid NCID. In step 1402, the current switch accesses a local database and gets the trunk group parameters associated with the terminating trunk group for transporting the call 802. After getting the parameters, the current switch proceeds to step 1404. In step 1404, the current switch determines the terminating trunk group type. If the terminating trunk is an ISUP trunk, the current switch proceeds to step 1408. In step 1408, the current switch analyzes the parameters associated with the ISUP trunk type to determine whether or not to deliver the NCID to the next switch. If the current switch is authorized to deliver the NCID, the current switch proceeds to step 1416. In step 1416, the current switch transports the call to the next switch along with a SS7 initial address message (IAM). The NCID is transported as part of the generic digits parameter of the IAM. The IAM contains setup information for the next switch which prepares the next switch to accept and complete the call 802. The format of the generic digits parameter is shown below in Table 6:

TABLE 6

Generic Digits Parameter:
Code: 11000001
Type: 0

| Byte #, Bit # | Description |
|---|---|
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 202 and the IAM, the current switch proceeds to step 1418, thereby exiting the switch processing.

Referring again to step 1408, if the current switch is not authorized to deliver the NCID to the next switch in an IAM message, the current switch proceeds to step 1412. In step 1412, the current switch transports the call 802 to the next switch under normal procedures which consists of sending an IAM message to the next switch without the NCID recorded as part of the generic digits parameter. After transporting the call 802, the current switch proceeds to step 1418, thereby exiting the switch processing.

Referring again to step 1404, if the current switch determines that the terminating trunk is not an ISUP, the current switch proceeds to step 1406. In step 1406, the current switch determines if the terminating trunk group is an ISDN trunk (the terminating trunk group is dedicated to one network customer). If the terminating trunk group is an ISDN, the current switch proceeds to step 1410. In step 1410, the current switch analyzes the parameters associated with the ISDN trunk group type to determine whether or not to deliver the NCID to the next switch. If the current switch is authorized to deliver the NCID, the current switch proceeds to step 1414. In step 1414, the current switch transports the call to the next switch along with a setup message. The setup message contains setup information for the next switch which prepares the next switch to accept and complete the call 802. The NCID is transported as part of the locking shift codeset 6 parameter of the setup message. The format of the locking shift codeset 6 parameter is shown below in Table 7:

TABLE 7

Locking Shift Codeset 6 Parameter:
Code: 11000001
Type: 0

| Byte #, Bit # | Description |
|---|---|
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 802 and the setup message, the current switch proceeds to step 1418, thereby exiting the switch processing.

Referring again to step 1410, if the current switch determines that it does not have authority to deliver the NCID to the next switch in a setup message, the current switch proceeds to step 1412. In step 1412, the current switch transports the call 802 to the next switch under normal procedures which consists of sending a setup message to the next switch without the NCID recorded as part of the locking shift codeset 6 parameter. After transporting the call 802, the current switch proceeds to step 1418, thereby exiting the switch processing.

Referring again to step 1412, this step is also entered from step 1118 on FIG. 11 when the current switch did not receive an NCID, is an intermediate or terminating switch, and is not authorized to create an NCID. In this case, in step 1412, the current switch also transports the call 802 to the next switch under normal procedures which consists of sending an IAM or setup message to the next switch without the NCID recorded as part of the parameter. After transporting the call 802, the current switch proceeds to step 1418, thereby exiting the switch processing.

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of generating a default call record or an expanded call record to store information about a telephone call from a calling location to a destination address, said method comprising the steps of:

(1) analyzing the telephone call to determine whether the default call record is sufficiently large to store call information pertaining to the telephone call, or whether the expanded call record must be used to store said call information pertaining to the telephone call;

(2) generating the default call record or the expanded call record for the telephone call as determined by step (1);

(3) recording timepoints in epoch time format in the default call record or the expanded call record as determined by step (1); and (4) sending the default call record or the expanded call record, as determined by step (1), to a billing center upon termination of the telephone call.

2. A method according to claim 1, wherein step (1) comprises:

(1.a) determining the number of digits associated with the telephone call;

(1.b) determining if the telephone call required operator assistance; and (1.c) determining if the telephone call invoked a special feature.

3. A method according to claim 2, wherein step (1.a) further comprises:

(1a.1) determining if the calling location contains more than ten digits;

(1.a.2) determining if the destination address contains more than seventeen digits; and (1a.3) determining if more than twenty-two digits, including supplemental data, are required for an authorization code of the telephone call;

wherein if steps (1a.1), (1.a.2), and (1.a.3) are all false, said method generates a default call record, otherwise, said method generates an expanded call record.

4. A method according to claim 2, wherein step (1.c) further comprises: (1.c.1) determining if the telephone call is a wideband call; and (1.c.2) determining if the telephone call is an enhanced voice service/network audio response system telephone call;

wherein if steps (1.c.1), and (1.c.2) are all false, said method generates a default call record, otherwise, said method generates an expanded call record.

5. A method according to claim 2, wherein step (1.b) further comprises:

(1.b.1) determining if the telephone includes pre-translated digits and operator assistance;

(1.b.2) determining if the telephone call includes more than ten pretranslated digits and no operator assistance; and (1.b.3) determining if the telephone call required an operator's assistance for a time and charge feature;

wherein if steps (1.b.1), (1.b.2) and (1.b.3) are all false, said method generates a default call record, otherwise, said method generates an expanded call record.

6. A method according to claim 1, wherein the default call record is a Call Detail Record (CDR) and the expanded call record is an Expanded Call Detail Record (ECDR), if the telephone call is a typical telephone call that accesses a public telephone network and does not require operator assistance.

7. A method according to claim 1, wherein the default call record is a Private Network Record (PNR) and the expanded call record is an Expanded Private Network Record (EPNR), if the telephone call is a typical telephone call that accesses a private telephone network and does not require operator assistance.

8. A method according to claim 1, wherein the default call record is an Operator Service Record (OSR) and the expanded call record is an Expanded Operator Service Record (EOSR), if the telephone call accesses a public telephone network and requires operator assistance.

9. A method according to claim 1, wherein the default call record is a Private Operator Service Record (POSR) and the expanded call record is an Expanded Private Operator Service Record (EPOSR), if the telephone call accesses a private telephone network and requires operator assistance.

10. A communications switch for generating a default call record or an expanded call record to store information about a telephone call from a calling location to a destination address, said communications switch comprising:

analyzing means for analyzing the telephone call to determine whether the default call record is sufficiently large to store call information pertaining to the telephone call, or whether the expanded call record must be used to store said call information pertaining to the telephone call;

generating means for generating the default call record or the expanded call record for the telephone call as determined by said analyzing means;

recording means for recording timepoints in epoch time format in the default call record or the expanded call record; and sending means for sending the default call record or the expanded call record to a billing center upon termination of the telephone call.

11. The communications switch according to claim 10, wherein said analyzing means comprises number determining means for determining the number of digits associated with the telephone call.

12. The communications switch according to claim 10, wherein said analyzing means comprises means for determining if the telephone call required operator assistance.

13. The communications switch according to claim 10, wherein said analyzing means comprises means for determining if the telephone call invoked a special feature.

14. The communications switch according to claim 11, wherein said number determining means comprises:

calling location means for determining if the calling location contains more than ten digits;

destination address means for determining if the destination address contains more than seventeen digits; and authorization code means for determining if more than twenty-two digits, including supplemental data, are required for an authorization code of the telephone call;

wherein if said calling location means, destination address means, and authorization code means are all false, said communications switch generates a default call record, otherwise, said communications switch generates an expanded call record.

* * * * *